Figure 1:

United States Patent [19]

Van Der Graaf et al.

[11] Patent Number: 5,405,626
[45] Date of Patent: Apr. 11, 1995

[54] PUFF PASTRY LAMINATES

[75] Inventors: Leendert M. Van Der Graaf, Vlaardingen; Nicolaas J. F. D. Verhoef, Maasland, both of Netherlands

[73] Assignee: Unilever Patent Holdings B.V., Rotterdam, Netherlands

[21] Appl. No.: 848,391

[22] Filed: Mar. 9, 1992

[30] Foreign Application Priority Data

Mar. 11, 1991 [EP] European Pat. Off. ............ 91200515

[51] Int. Cl.⁶ .................................................. A23P 1/08
[52] U.S. Cl. ..................................... 426/94; 426/302; 426/556
[58] Field of Search .......................... 426/94, 556, 302

[56] References Cited

U.S. PATENT DOCUMENTS

| | | | |
|---|---|---|---|
| 3,219,456 | 11/1965 | Matz et al. | 426/307 |
| 3,250,626 | 5/1966 | Thelen | 99/86 |
| 3,250,627 | 5/1966 | Thelen | 99/92 |
| 3,293,043 | 12/1966 | Matz et al. | 426/307 |
| 3,851,084 | 11/1974 | Rossen et al. | 426/343 |
| 4,275,082 | 6/1981 | Dougan | 426/283 |
| 4,283,424 | 8/1981 | Manoski et al. | 426/94 |
| 4,293,572 | 10/1981 | Silva et al. | 426/307 |
| 5,130,151 | 7/1992 | Averbach | 426/302 |

FOREIGN PATENT DOCUMENTS

| | | | |
|---|---|---|---|
| 0088361 | 9/1983 | European Pat. Off. | A21D 13/08 |
| 0383134 | 8/1990 | European Pat. Off. | A21D 13/00 |
| 748423 | 7/1933 | France | A21D 13/00 |
| 61-260830 | 11/1986 | Japan | A21D 8/00 |
| 2182144 | 7/1990 | Japan | A21D 13/08 |
| 484621 | 3/1970 | Switzerland | A21D 8/00 |
| 379602 | 9/1952 | United Kingdom . | |

*Primary Examiner*—Donald E. Czaja
*Assistant Examiner*—Mary S. Mims
*Attorney, Agent, or Firm*—Cushman Darby & Cushman

[57] ABSTRACT

A baked composite dough product comprising a puff pastry dough sheet having attached thereto, at least at one side, a sheet of pastry dough which acts as an anchoring layer for a moisture-barrier coating which is applied on to the pastry layer after baking.

The invention also relates to said baked products with a moist filling material applied on to the moisture-barrier coating.

7 Claims, 1 Drawing Sheet

PUFF PASTRY LAMINATES

This invention relates to new and useful puff pastry products and intermediates. This invention is also directed to processes for making such intermediates and baked products.

Puff pastry dough is generally made from flour, water, salt, shortening material and additives, if required. The dough is rolled out to a sheet, folded several times and rolled out again, care being taken that the sheets do not adhere more than spotwise by introducing separating layers of fat or dry flour. Upon baking, a light structure of numerous crisp layers is developed. Several methods for making puff pastry dough are known in the art, but the final products are generally comparable.

Puff pastry is usually meant to be filled with a savoury or sweet filling material, either before or after baking. A problem arises, however, when this filling material is relatively moist, because the moisture readily migrates to the puff pastry, thereby gradually, but markedly, reducing the crispness and volume. This problem is especially encountered with these filled products when stored at ambient, chilled or at deep-frozen temperatures, although at a different rate.

It is known in the art that fatty moisture-barrier layers can be applied for protecting baked crisp bakery products from penetration of moisture originating from the filling material or from the environment. For that purpose, ice-cream wafers, for instance, are usually coated with a chocolate-based couverture prior to filling with ice cream. Puff pastry cannot be protected in this way, however, because any fat-based coating material, when applied to puff pastry, does not sufficiently adhere to the surface because of the crisp nature thereof. The coating will crack, peel off, etc. and thus the moisture can still migrate into the puff pastry material, with detrimental effect.

An object of the invention is to provide means for reducing or eliminating this problem of puff pastry products losing their crispness and volume, owing to moisture migration.

It now has been found that by arranging a pastry dough layer at one or both sides of the puff pastry dough and then baking this composite dough system, a product is obtained which can subsequently be provided with an edible protective layer having moisture-barrier properties. Accordingly, for solving the above-mentioned problem, the invention provides a puff pastry dough sheet having attached thereto, at least at one side, a sheet of pastry dough, which acts as a kind of anchoring layer for the moisture-barrier layer, which is provided on top of the pastry dough.

The present invention therefore relates to a baked composite dough product comprising a puff pastry layer having attached thereto, at least at one side, an anchoring layer of pastry, provided with at least one edible protective layer having moisture-barrier properties.

The term "anchoring layer of pastry" as used in this specification and claims is defined as any pastry product having generally uniform properties in all directions, leaving crust formation aside, examples of such pastry being: bread, pizza, cookie, shortcrust and cake pastry. It is known from Japanese patent specification JP-A-61-260,830 (Tokyo Delica Co. Ltd) to provide a bottom crust for a pizza which is a laminate of puff pastry as the lower layer and a normal pizza crust as the upper layer. The upper layer absorbs the moisture of the filling, but is said to protect the lower layer. In practice, the moisture migration does not stop in the upper layer, however, so that the final product still becomes soggy upon storage.

After baking, the composite layer of baked product according to the present invention is provided with an edible protective layer having moisture-barrier properties, suitable examples of protective coatings being hydrophobic coatings, e.g. fat coatings such as those consisting of triglyceride fats, coatings of waxes, sucrose polyesters or mixtures thereof, or multiple coatings comprising at least one hydrophobic layer. The best results are obtained with acetofat, an acetylated mono-glyceride or acetylated mono/di-glycerides. The continuity of this coating may be improved by arranging a glaze layer between the pastry dough layer and the edible protective layer having moisture-barrier properties.

The invention relates both to the par-baked and fully baked products.

The invention finally relates to the baked dough products as described hereinbefore, comprising a moist filling material of the savoury or sweet type, such as gellified fruit and juice, pastry fillings, pie fillings and ragout or hash. Vegetable material, dairy material and combinations thereof may also be used.

Figure 2:
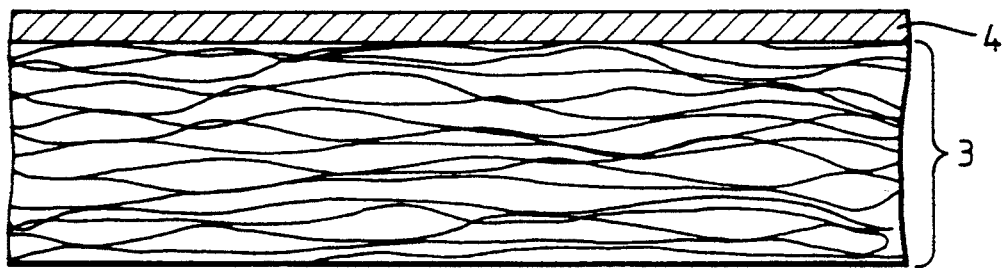
Figure 3:
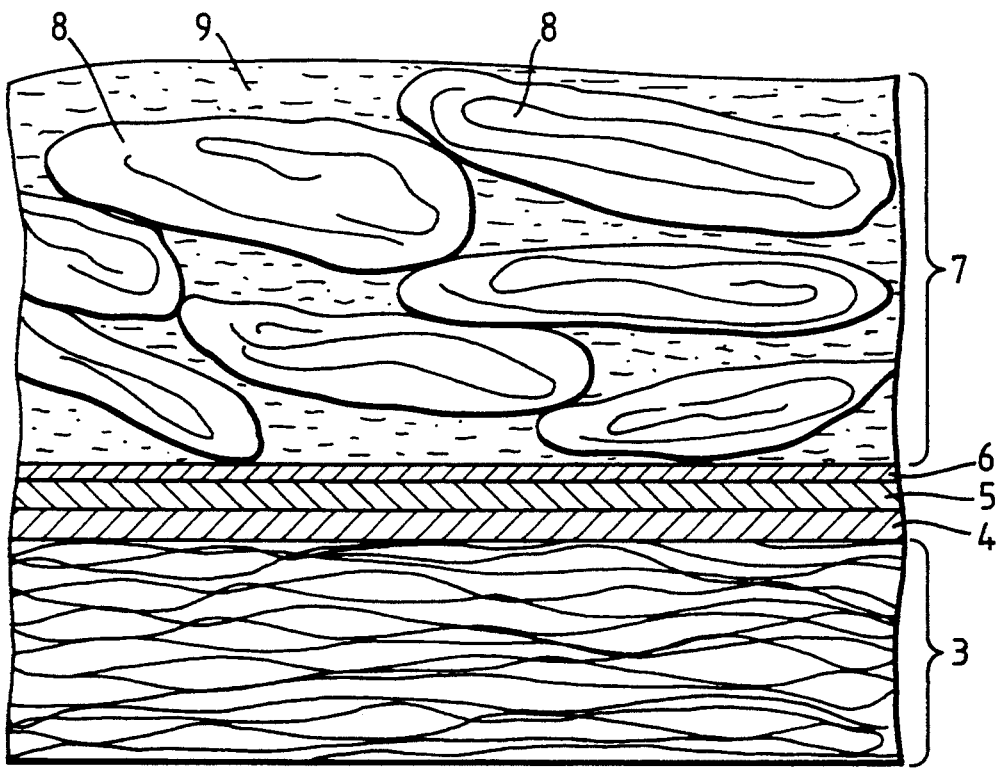

The invention will be exemplified in the following, non-limiting examples of currently preferred embodiments, reference being made to the drawings, wherein FIG. 1 is a schematic cross-sectional view on a large scale of an uncooked puff pastry dough FIG. 2 is a similar view of a cooked puff pastry product of the invention and FIG. 3 is a schematic cross-sectional view of a ready filled puff pastry product.

Parts and percentages as used in the specification, the examples and the claims refer to weights, unless otherwise indicated.

EXAMPLE 1

A usual puff pastry dough was made from

| | |
|---|---|
| flour (Zeeuws ex Meneba Nl) | 100 parts |
| salt | 1 part |
| dough margarine (Trio Korst ex B&J) | 5 parts |
| water | 49 parts |

After allowing the dough to rest for 10 minutes, it was rolled to a sheet; 80 parts of pastry margarine were folded in the dough, which was given 4 so-called half-turns, producing a laminated dough with (theoretically) 360 margarine layers. The final puff pastry dough was rolled to a sheet of about 11 mm thickness.

A shortcrust dough of following composition was prepared as a protective dough:

| | |
|---|---|
| Flour (Banket Extra ex Wessanen Nl) | 100 parts |
| Biskien Zacht (shortening ex B&J Nl) | 52 parts |
| Salt | 1 part |
| Water | 23 parts |

The dough was made in a standard two-step procedure, first mixing the solid components and then adding water. After a rest period of 10 minutes, the shortcrust dough was sheeted and rolled to a thickness of 5–6 mm. The resulting sheet was then laminated on top of the puff pastry dough and the combined dough system was stepwise rolled out to a sheet of about 4 mm thickness. The product obtained by this method is shown schematically in section in FIG. 1, the puff pastry layer 1 having a shortcrust dough layer 2 laminated thereto. After cutting this composite sheet into pieces and depositing the dough pieces in separate disposable pie baking trays, the dough was baked at 200° C. for about 25 minutes under constraint to control lift, followed by about 5 minutes without constraint. If desired, the baked product could be further dried. A light crisp puff pastry product was obtained, schematically shown in section in FIG. 2. The puff pastry dough has been expanded to a flaky puff pastry layer 3 having on top a layer of cooked shortcrust 4.

After cooling the product, a thin layer 5 of acetofat was applied as a moisture barrier by spraying, brushing, and the like, forming a coating on the shortcrust surface. For further protection from moisture penetration, the edge of the baked product could also be sealed on to the baking tray. The protection obtained increased with the coating weight and the number of any subsequent moisture barrier coating layers 6. Very good results were obtained with a total coating weight of about 30 g/m$^2$, but in practice coating weights ranging from 10 to 50 g/m$^2$ gave suitable results.

After solidification of the moisture-barrier coating layer, different fillings were applied. Filled products were then put in a KOMA blast freezer for 1 hour at −30° to −35° C. and subsequently stored in a freezing cabinet at −10° C. and −20° C. In FIG. 3, a filling 7 is shown comprising apple pieces 8 in a sweet, thickened sauce 9.

After various storage periods, product quality was assessed after reheating in a microwave oven for 3–5 minutes at high intensity (600 Watt) or for about 3 minutes' thawing at low intensity (240 Watt), followed by 3.5 minutes' heating at high intensity. The products were heated directly after they had been taken out of the freezer.

Baked and filled products made of usual puff pastry dough without shortcrust lost their crispness already before freezing and were judged to be unacceptable. Similar products comprising laminated puff pastry, however, were considerably improved and these products were judged by an expert panel as crisp to very crisp when stored for up to about 3 months at −10° C. and for 9 months at −20° C. In addition, weight increase of the pastry component (container) of the product was measured. As the total product weight was constant, the increase was due to migration via liquid or vapour phase from the filling to the pastry. The increase in weight was highest (12%) with filled laminated but non-coated products, considerably lower (6%) with laminated products with only an inner moisture barrier coating and very low (2%) with laminated products with both an inner moisture barrier coating and a moisture-barrier coating seal on to the baking tray.

EXAMPLE 2

The experiments of Example 1 were repeated, using in addition several barrier coating materials, e.g.:

1. Mixture of 10% BO (soy bean oil), 20% CN31 (hardened coconut fat, melting point 31° C.), 30% PO (palm oil) and 40% PO45 (hardened palm oil fat, melting point 45° C.)
2. Mixture of 50% BO (soy bean oil) and 50% BO 36 (hardened soy bean oil, melting point 36° C.)

These fat mixtures were used alone and also in combination with acetoglyceride. 10–50% of acetoglyceride could be replaced by one of these fat mixtures, resulting in about the same protection as an acetoglyceride coating alone applied on protective dough-covered puff pastry dough.

The use of these barrier-coating materials gave a considerable improvement of the crispness retention after microwave baking. Although moisture-barrier properties of acetoglyceride coated products were comparable or somewhat better as compared with products coated with triglycerides, crispness after microwave heating of acetoglyceride-coated products was generally better. This suggests that not only moisture-barrier properties of acetoglyceride are playing a role.

EXAMPLE 3

Using the recipe and method of Example 1, a composite pastry sheet was made from shortcrust dough on top of puff pastry dough and rolled out together to a final thickness of about 3 mm. Oval dough pieces of about 11 to 13 cm were cut out and baked and thereafter used as lids on top of filled pie containers. After heating the resulting products in a microwave oven, considerable crispier lids resulted than lids of puff pastry only.

EXAMPLE 4

The process of Example 1 was repeated, however substituting sweet cookie dough for the shortcrust dough.

The cooky dough was prepared by homogenizing

| | |
|---|---|
| margarine (Trio cake ex B&J) | 200 parts |
| sugar | 100 parts |
| grated lemon peel | 2.5 parts |
| water | 7 parts | and thereafter adding

| | |
|---|---|
| flour (Banket extra ex Wessanen) | 300 parts | and mixing until a homogeneous dough was obtained. This dough was sheeted to 5 mm and laminated on to the puff pastry dough sheet. The crispness retention of the final products was comparable with that of Example 1.

EXAMPLE 5

The experiments of Example 1 were repeated but using, instead of a thin layer of acetofat, a mixture of 50% by weight of acetofat and 50% by weight of a sugar polyester derived from fatty acids of fully hardened soybean oil and fatty acids from partially hardened soybean oil in a weight ratio of 1:1 and having the following solids content as measured by NMR:

| −20° C. | 0° C. | 10° C. | 20° C. | 30° C. | 40° C. |
|---|---|---|---|---|---|
| 88.2 | 78.9 | 73.3 | 63.1 | 40.4 | 5.4 | and having a melting point of 43° C.

A total coating weight of 30 g/m$^2$ was brushed on to the shortcrust layer.

An excellent protection of the baked layers from moisture penetration was obtained and the product had a crispness similar to the product prepared in Example 1.

We claim:

1. A composite dough product comprising a baked composite of a puff pastry layer having attached thereto, at least at one side, an anchoring layer of pastry, which baked composite is provided with at least one edible protective layer having moisture-barrier properties, which protective layer(s) is (are) attached to the anchoring layer(s), and is selected from the group consisting of triglycerides, waxes, sucrose polyesters, acetofats, and mixtures thereof.

2. A product according to claim 1, characterized in that the protective layer comprises an acetofat.

3. A product according to claim 1, characterized in that the protective layer is present in an amount of 10–50 g/m$^2$.

4. A product according to claim 1, characterized in that a moist filling material is provided on top of the protective layer.

5. A product according to claim 4, characterized in that the moist filling material is a savoury or a sweet filling material.

6. A product according to claim 1 wherein the anchoring layer is an unleavened pastry.

7. A product according to claim 6 wherein the anchoring layer is a short crust or cookie-dough layer.

* * * * *